United States Patent
Satran et al.

(10) Patent No.: US 8,858,127 B2
(45) Date of Patent: Oct. 14, 2014

(54) CUTTING INSERT HAVING V-SHAPED CORNER VIEWS AND MILLING TOOL

(75) Inventors: Amir Satran, Kfar Vradim (IL); Evgeny Tulchinsky, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 291 days.

(21) Appl. No.: 13/471,130

(22) Filed: May 14, 2012

(65) Prior Publication Data

US 2013/0051936 A1 Feb. 28, 2013

(30) Foreign Application Priority Data

Aug. 22, 2011 (IL) .......................................... 214782

(51) Int. Cl.
*B23C 5/20* (2006.01)
*B23C 5/08* (2006.01)

(52) U.S. Cl.
CPC ............. *B23C 5/08* (2013.01); *B23C 2200/164* (2013.01); *B23C 2200/085* (2013.01); *B23C 2210/045* (2013.01); *B23C 2200/0455* (2013.01); *B23C 5/202* (2013.01); *B23C 2210/0428* (2013.01)
USPC ........................................... 407/42; 407/113

(58) Field of Classification Search
CPC .......... B23C 5/109; B23C 5/20; B23C 5/202; B23C 5/207; B23C 2200/045; B23C 2200/0433; B23C 2200/0494; B23C 2200/08; B23C 2200/0414; B23C 2200/0492
USPC ...................... 407/42, 55, 60, 61, 113, 33, 34
See application file for complete search history.

(56) References Cited

U.S. PATENT DOCUMENTS

| | | | | |
|---|---|---|---|---|
| 5,383,750 A | * | 1/1995 | Satran et al. | 407/113 |
| 6,921,233 B2 | * | 7/2005 | Duerr et al. | 407/34 |
| 2005/0169716 A1 | | 8/2005 | Smilovici et al. | |
| 2011/0170963 A1 | | 7/2011 | Smilovici et al. | |

FOREIGN PATENT DOCUMENTS

| | | | |
|---|---|---|---|
| DE | 10 2009 020373 A1 | 11/2010 | |
| JP | 2004284010 A * | 10/2004 | B23C 5/20 |
| WO | WO 2009/151169 A1 | 12/2009 | |

OTHER PUBLICATIONS

International Search Report dated Dec. 10, 2012 issued in counterpart PCT application (No. PCT/IL2012/050300).

* cited by examiner

*Primary Examiner* — Daniel Howell
(74) *Attorney, Agent, or Firm* — Womble Carlyle

(57) ABSTRACT

A cutting insert has eight identical main cutting edges. Four main cutting edges can operate with a positive axial rake and four can operate with a negative axial rake. The cutting insert has two opposing identical end surfaces and a peripheral surface extending between the end surfaces. The cutting insert is square-shaped in end views. Each end surface has four corners, two lowered corners and two raised corners. A diagonal line passes through the lowered corners of each end surface. For a given orientation of the cutting insert the peripheral surface has a V-shape in views along the two diagonal lines associated with each end surface, the two V-shapes being identical in form and oriented in opposite directions.

20 Claims, 3 Drawing Sheets

CUTTING INSERT HAVING V-SHAPED CORNER VIEWS AND MILLING TOOL

FIELD OF THE INVENTION

The present invention relates to cutting inserts and milling tools for metal cutting operations.

BACKGROUND OF THE INVENTION

Such milling tools include, for example, slotting cutters, extended flute milling cutters, end mills and face mills. The cutting inserts used in such milling cutters may have a major cutting edge configured to mill a shoulder in a workpiece. The cutting inserts may also have a secondary cutting edge adjacent the major cutting edge with a corner cutting edge extending between the two. At least a section of the adjacent secondary cutting edge may be configured to act as a wiper to provide a good surface finish on the surface of the workpiece adjacent the shoulder.

It is an object of the present invention to provide an improved cutting insert.

It is also an object of the present invention to provide a milling tool for such a cutting insert.

SUMMARY OF THE INVENTION

In accordance with a first aspect of the subject matter of the present application, there is provided a cutting insert comprising two opposing identical end surfaces and a peripheral surface extending between the end surfaces. The peripheral surface meets the end surface at peripheral cutting edges.

The cutting insert may be square-shaped in an end view. Each end surface has four corners, two diagonally opposite lowered corners and two diagonally opposite raised corners. A diagonal line passes through the lowered corners of each end surface.

For a given orientation of the cutting insert the peripheral surface has a V-shape in a view along the diagonal line associated with one end surface, and a V-shape in a view along the diagonal line associated with the other end surface. The two V-shapes are identical in form and oriented in opposite directions.

In an end view of the cutting insert the diagonal line associated with one end surface is perpendicular to the diagonal line associated with the other end surface.

In accordance with aspects of the subject matter of the present application, the peripheral surface comprises four identical side surfaces.

Adjacent side surfaces may merges via a corner surface. The side surfaces may be parallelogrammatic in shape.

In accordance with aspects of the subject matter of the present application, a through hole extends between and opens out to the end surfaces.

Further in accordance with aspects of the subject matter of the present application, a rake surface extends from the peripheral cutting edge in each end surface.

The peripheral cutting edge in each end surface comprises four corner cutting edges located at the corners of the end surface and four main cutting edges extending between pairs of adjacent corner cutting edges. One corner cutting edge of each such pair of adjacent corner cutting edges is located at a lowered corner and the other corner cutting edge is located at a raised corner.

In accordance with a further aspect of the subject matter of the present application, there is provided a milling tool comprising a plurality of cutting inserts in accordance with aspects of the subject matter of the present application and a plurality of insert pockets in which the cutting inserts are retained. Each insert pocket may comprise a base wall adjacent a side wall. The side wall may be provided with two spaced apart side abutment surfaces that abut a given side surface of the cutting insert, and the base wall may be provided with two non-coplanar base abutment surfaces that abut a non-operative end surface of the cutting insert.

In accordance with some aspects of the subject matter of the present application, alternate cutting inserts may be oriented so that the operative main cutting edge of one cutting insert operates with a positive axial rake and the operative main cutting edge of an adjacent cutting insert operates with a negative axial rake.

DETAILED DESCRIPTION OF THE INVENTION

Figure 1:
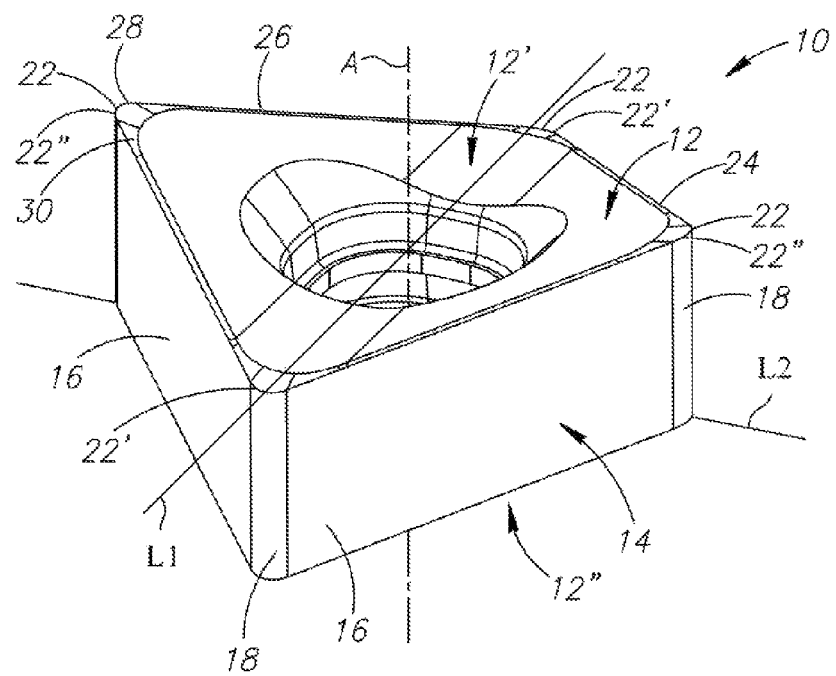
FIG. 1 is a perspective view of a cutting insert in accordance with embodiments of the present application.
Figure 2:
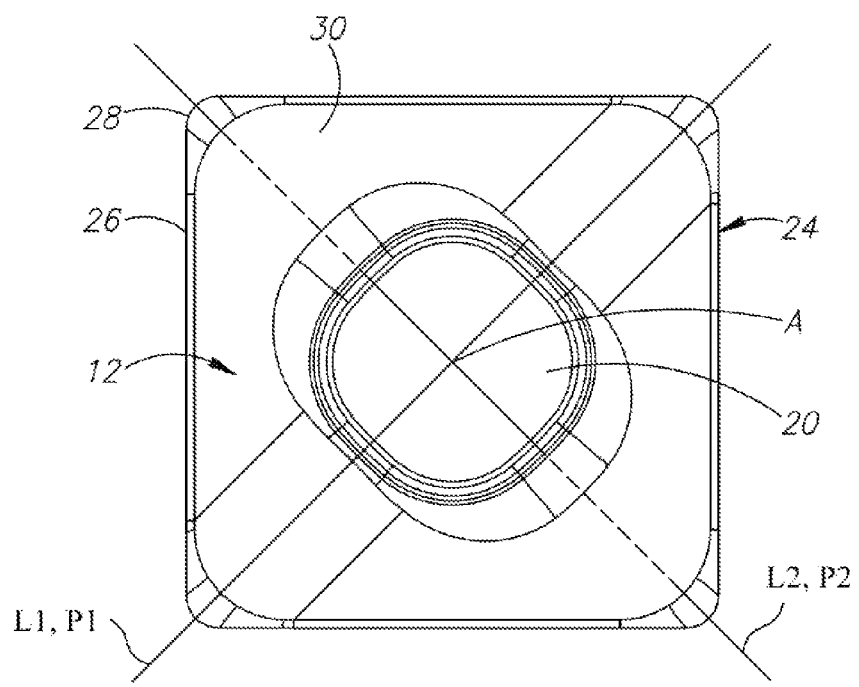
FIG. 2 is a top view of the cutting insert shown in FIG. 1.

In the following description, various aspects of the present invention will be described. For purposes of explanation, specific configurations and details are set forth in sufficient detail to provide a thorough understanding of the present application. However, it will also be apparent to one skilled in the art that the subject matter of the present application may be practiced without the specific details presented herein.

Reference is first drawn to FIGS. 1 to 6, showing a cutting insert 10 in accordance with the present application. The cutting insert 10 is intended for use in milling cutting operations and may be made of a hard and wear-resistant material such as cemented carbide, by form-pressing and sintering carbide powders in a binder.

The cutting insert 10 has two opposing identical end surfaces 12 and a peripheral surface 14 extending between the end surfaces 12. The end surfaces 12 can be considered, without loss of generality, to constitute an upper end surface 12' and a lower end surface 12" of the cutting insert. The cutting insert 10 is square-shaped in an end view thereof. The peripheral side surface 14 includes four identical side surfaces 16 and four identical corner surfaces 18 at which adjacent side surfaces 16 merge. As can be seen FIGS. 5 and 6, in a side view of the cutting insert 10 the side surfaces 16 are parallelogrammatic in shape. The cutting insert 10 has a central axis A and a through hole 20 extending between the end surfaces 12. The through hole may be centered about central axis A.

The cutting insert 10 has a median plane M located between the end surfaces 12 and passing through the peripheral surface 14. The median plane M may be perpendicular to the peripheral surface 14. The median plane M may be perpendicular to the central axis A.

Each end surface 12 has four corners 22, two diagonally opposite lowered corners 22' and two diagonally opposite raised corners 22". The lowered corners 22' are closer to the median plane M than the raised corners 22". Each corner surface 18 extends between a given raised corner 20" of one of the two opposing end surfaces 12 (e.g., the upper end surface 12') and a given lowered corner 20' of the other of one of the two opposing end surfaces 12 (e.g., the lower end surface 12"). A diagonal line L1, L2 passes through the lowered corners 20' of each end surface 12. In other words, a diagonal line is associated with each end surface. Each end surface 12 slopes from the raised corners 22" to the diagonal line L1, L2 associated with that end surface 12. In an end view of the cutting insert 10 the central axis A passes through an intersection of the two diagonal lines L1, L2, it being understood that the diagonal lines L1, L2 associated with the two end surfaces 12', 12" do not intersect in three dimensions. The intersection of the central axis A with each diagonal line L1, L2 defines a corresponding imaginary diagonal plane P1, P2.

A peripheral cutting edge 24 is formed at the intersection of each end surface 12 and the peripheral surface 14. For each end surface 12, the peripheral cutting edge 24 comprises four main cutting edges 26, formed by the intersection of the side surfaces 16 with the end surface 12 and four corner cutting edges 28, formed by the intersection of the corner surfaces 18 with the end surface 12. Therefore, the cutting insert 10 is indexable with a total of eight main cutting edges 26 and eight corner cutting edges 28. Each main cutting edge 26 extends between a pair of corner cutting edges 28. One corner cutting edge 28 of each such pair of corner cutting edges 28 connecting to a common main cutting edge 26 is located at a lowered corner (22') and the other corner cutting edge (28) of that pair is located at a raised corner (22"). In each end surface 12, extending from the peripheral cutting edge 24 is a rake surface 30 along which chips cut from a workpiece flow during a metal cutting operation.

Figure 3:
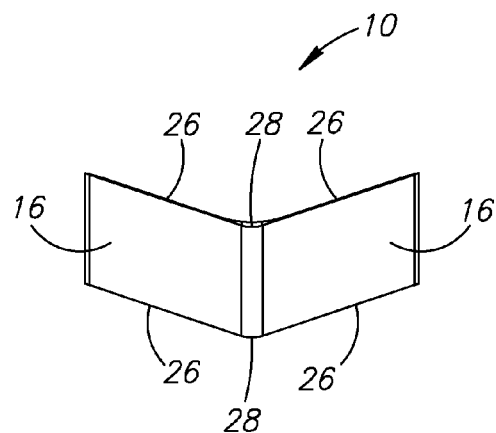
FIG. 3 is a first corner view of the peripheral surface, along a first diagonal of the cutting insert shown in FIG. 1.
Figure 4:
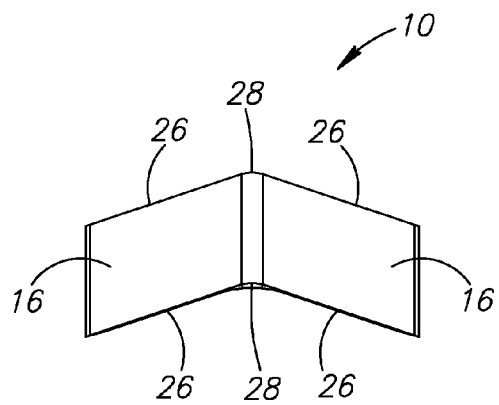
FIG. 4 is a second corner view of the peripheral surface along a second diagonal of the cutting insert shown in FIG. 1.
Figure 5:
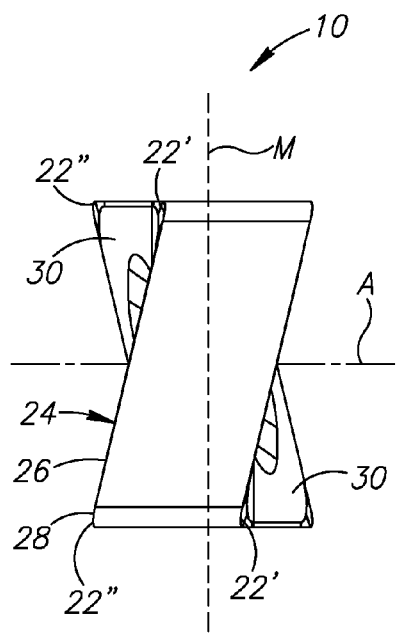
FIG. 5 is a side view of the cutting insert shown in FIG. 1 oriented as a right-hand cutting insert.
Figure 6:
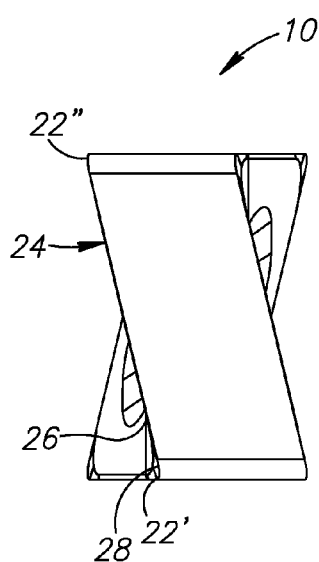
FIG. 6 is a side view of the cutting insert shown in FIG. 1 oriented as a left-hand cutting insert.

FIGS. 3 and 4 show views along the diagonal lines for a given orientation of the cutting insert 10. As can be seen from the figures, the four main cutting edges 26 on each end surface 12 are mirror symmetric about the imaginary diagonal plane P1, P2 associated with that end surface 12', 12". As mentioned above, for the orientation of the cutting insert 10 as shown in FIG. 1, one end surface 12 will be referred to as an upper end surface 12' and the other end surface 12 will be referred to as a lower end surface 12". FIG. 3 shows the view along the diagonal line L1 associated with the upper end surface 12' and is referred to herein as a first corner view of the cutting insert. In the first corner view, the peripheral surface 14 has an upward-facing V-shape. FIG. 4 shows the view along the diagonal line L2 associated with the lower end surface 12" and is referred to herein as a second corner view of the cutting insert. In the second corner view, the peripheral surface 14 has a downward-facing V-shape. The second corner view being a 90° rotation about the central axis A relative to the first side view. It is understood from the foregoing that cutting insert may have 180° rotational symmetry about central axis A. Both views are for the orientation of the cutting insert 10 as shown in FIG. 1. As can be seen, from FIGS. 3 and 4 the peripheral surface 14 has a V-shape in a view along the diagonal lines L1, L2. The V-shapes seen in FIGS. 3 and 4 are identical in form to but with the "V" oriented in opposite directions.

Figure 7:
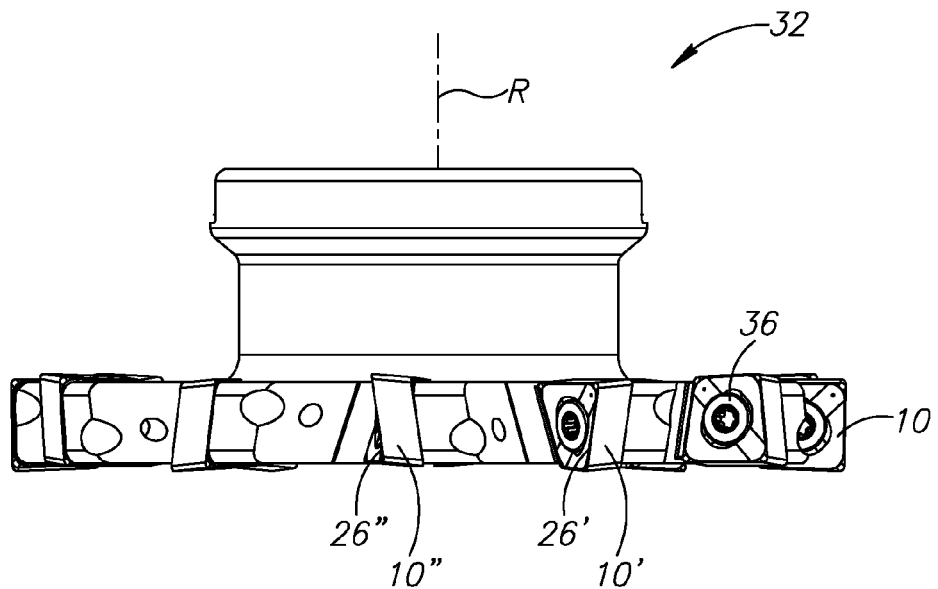
FIG. 7 is a side view of a cutting tool in accordance with embodiments of the present application.
Figure 8:
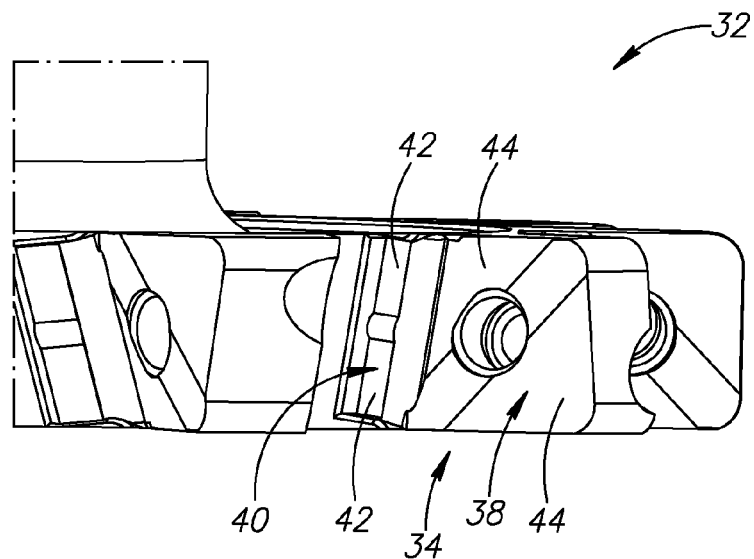
FIG. 8 is a partial view of the cutting tool of FIG. 8 with two cutting inserts removed from the insert pockets.

Attention is now drawn to FIGS. 7 and 8 showing a milling tool 32 in accordance with a specific application of the subject matter of the present application. The milling tool 32 has an axis of rotation R and a plurality of insert pockets 34 in which the cutting inserts 10 are mounted and secured by means of a screw 36. Each insert pocket 34 comprises a base wall 38 adjacent a side wall 40. The side wall 40 is provided with two spaced apart side abutment surfaces 42 that abut a given side surface 16 of the cutting insert 10. The base wall 38 is provided with two non-coplanar base abutment surfaces 44 that abut a non-operative end surface 12 of the cutting insert 10.

The cutting inserts 10 may be mounted such that they are alternately disposed with two different orientations of the operative main cutting edge 26. Some of the cutting inserts 10' may be oriented so their operative main cutting edge 26' presents a positive axial rake angle (illustrated also in FIG. 5) and the other cutting inserts 10" may be oriented so their operative main cutting edge 26" present a negative axial rake angle (illustrated also in FIG. 6).

Consequently, each end surface 12 of the cutting insert 10 in accordance with the subject matter of the present application has two main cutting edges 26 that can operate with a positive axial rake and two that can operate with a negative axial rake. Therefore, the cutting insert 10 has in total four main cutting edges 26 that can operate with a positive axial rake and four that can operate with a negative axial rake.

The cutting inserts 10 in accordance with the subject matter of the present application are clearly advantageous when both positive and negative axial rakes are required. A single cutting insert 10 can be used to provide cutting edges with both positive and negative axial rake angles, a total of four of each kind.

Although the present invention has been described to a certain degree of particularity, it should be understood that various alterations and modifications could be made without departing from the scope of the invention as hereinafter claimed.

What is claimed is:

1. A cutting insert (10) comprising two opposing identical end surfaces (12) and a peripheral surface (14) extending therebetween, the peripheral surface (14) comprising four identical side surfaces (16) and meeting the end surface at peripheral cutting edges (24), the cutting insert (10) being square-shaped in end views thereof, each end surface (12) having four corners (22), two diagonally opposite lowered corners (22') and two diagonally opposite raised corners (22");
  a diagonal line (L1, L2) passes through the lowered corners (22') of each end surface (12);
  wherein for a given orientation of the cutting insert (10):
  the peripheral surface (14) has a V-shape in a view along the diagonal line (L1) associated with one end surface (12'), and
  the peripheral surface (14) has a V-shape in a view along the diagonal line (L2) associated with the other end surface (12");
  the two V-shapes being identical in form and oriented in opposite directions.

2. The cutting insert (10) according to claim 1, wherein each side surface (16) merges with an adjacent side surface (16) via a corner surface (18).

3. The cutting insert (10) according to claim 2, wherein the side surfaces (16) are parallelogrammatic in shape.

4. The cutting insert (10) according to claim 1, wherein the side surfaces (16) are parallelogrammatic in shape.

5. The cutting insert (10) according to claim 1, comprising a through hole (20) extending between and opening out to the end surfaces (12).

6. The cutting insert (10) according to claim 1, wherein in an end view of the cutting insert (10) the diagonal line (L1, L2) associated with one end surface is perpendicular to the diagonal line (L2, L1) associated with the other end surface.

7. The cutting insert (10) according to claim 1, wherein a rake surface (30) extends from the peripheral cutting edge (24) in each end surface (12).

8. The cutting insert according to claim 1, wherein the peripheral cutting edge (24) in each end surface (12) comprises four corner cutting edges (28) located at the corners (22) of the end surface (12) and four main cutting edges (26) extending between pairs of adjacent corner cutting edges (28).

9. The cutting insert (10) according to claim 8, wherein one corner cutting edge (28) of each such pair of adjacent corner cutting edges (28) is located at a lowered corner (22') and the other corner cutting edge (28) is located at a raised corner (22").

10. A milling tool (32) comprising:
a plurality of cutting inserts (10) in accordance with claim 1; and
a plurality of insert pockets (34) in which the cutting inserts (10) are retained.

11. The milling tool (32) according to claim 10, wherein:
each insert pocket (34) comprises a base wall (38) adjacent a side wall (40),
the side wall (40) is provided with two spaced apart side abutment surfaces (42) that abut a given side surface (16) of the cutting insert (10), and
the base wall (38) is provided with two non-coplanar base abutment surfaces (44) that abut a non-operative end surface (12) of the cutting insert (10).

12. The milling tool (32) according to claim 11, wherein alternate cutting inserts (10) are oriented so that the operative main cutting edge (26') of one cutting insert (10') operates with a positive axial rake and the operative main cutting edge (26") of an adjacent cutting insert (10") operates with a negative axial rake.

13. The milling tool (32) according to claim 10, wherein alternate cutting inserts (10) are oriented so that the operative main cutting edge (26') of one cutting insert (10') operates with a positive axial rake and the operative main cutting edge (26") of an adjacent cutting insert (10") operates with a negative axial rake.

14. A squared-shaped cutting insert (10) having a central axis (A) and comprising:
two opposing identical square-shaped end surfaces (12) through which the central axis (A) passes, a median plane (M) between the end surfaces, each end surface (12) having four corners (22), two diagonally opposite lowered corners (22') and two diagonally opposite raised corners (22"), the corners being raised and lowered relative to the median plane (M);
a peripheral surface (14) extending between the end surfaces and meets the end surfaces at peripheral cutting edges (24), the peripheral surface comprising four identical side surfaces (16);
in a first corner view of the cutting insert the peripheral surface (14) has an upward-facing V-shape; and
in a second corner view of the cutting insert the peripheral surface has a downward-facing V-shape, the second corner view being a 90° rotation about the central axis (A) relative to the first corner view.

15. The cutting insert (10) according to claim 14, wherein the side surfaces (16) are parallelogrammatic in shape.

16. The cutting insert (10) according to claim 14, comprising a through hole (20) extending between and opening out to the end surfaces (12).

17. The cutting insert (10) according to claim 14, wherein the cutting insert has 180° rotational symmetry about the central axis (A).

18. The cutting insert according to claim 14, wherein the peripheral cutting edge (24) in each end surface (12) comprises four corner cutting edges (28) located at the corners (22) of the end surface (12) and four main cutting edges (26) extending between pairs of adjacent corner cutting edges (28).

19. The cutting insert (10) according to claim 18, wherein one corner cutting edge (28) of each such pair of adjacent corner cutting edges (28) is located at a lowered corner (22') and the other corner cutting edge (28) is located at a raised corner (22").

20. A cutting insert (10) comprising two opposing identical end surfaces (12) through which a central axis (A) passes, and a peripheral surface (14) extending therebetween, the peripheral surface (14) meeting the end surface at peripheral cutting edges (24), the cutting insert (10) being square-shaped in end views thereof, each end surface (12) having four corners (22), two diagonally opposite lowered corners (22') and two diagonally opposite raised corners (22");
a diagonal line (L1, L2) passes through the lowered corners (22') of each end surface (12);
wherein for a given orientation of the cutting insert (10):
the peripheral surface (14) has a V-shape in a view along the diagonal line (L1) associated with one end surface (12'), and
the peripheral surface (14) has a V-shape in a view along the diagonal line (L2) associated with the other end surface (12");
the two V-shapes being identical in form and oriented in opposite directions; and
wherein each peripheral cutting edge (24) comprises four main cutting edges (26), the four main cutting edges (26) on a given end surface (12', 12") being minor symmetric about an imaginary diagonal plane (P1, P2) defined by the central axis (A) and a corresponding diagonal line (L1, L2).

* * * * *